United States Patent
Bombacino et al.

(10) Patent No.: US 10,171,571 B2
(45) Date of Patent: *Jan. 1, 2019

(54) DETERMINING AND ASSIGNING A DEFAULT VALUE TO A CURRENT SERVER RESPONSE IF THE CURRENT SERVER RESPONSE IS NOT RECEIVED FROM THE SERVER WITHIN A TIME-LIMIT

(71) Applicant: International Business Machines Corporation, Armonk, NY (US)

(72) Inventors: Vinicio Bombacino, Rome (IT); Paolo Cavazza, Rome (IT); Leonardo Lanni, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/399,731

(22) Filed: Jan. 5, 2017

(65) Prior Publication Data
US 2017/0118277 A1    Apr. 27, 2017

Related U.S. Application Data

(63) Continuation of application No. 13/763,573, filed on Feb. 8, 2013, now Pat. No. 9,584,357.

(30) Foreign Application Priority Data

Feb. 22, 2012  (EP) .................................... 12156435

(51) Int. Cl.
*G06F 15/16*   (2006.01)
*H04L 29/08*   (2006.01)
*H04L 29/06*   (2006.01)

(52) U.S. Cl.
CPC .... *H04L 67/1008* (2013.01); *H04L 29/06047* (2013.01); *H04L 67/02* (2013.01); *H04L 67/325* (2013.01); *H04L 67/42* (2013.01)

(58) Field of Classification Search
CPC ........ H04L 67/325; H04L 67/42; H04L 67/32
See application file for complete search history.

(56) References Cited

U.S. PATENT DOCUMENTS 6,311,216 B1    10/2001  Smith et al.
7,096,418 B1 *   8/2006  Singhal ............. G06F 17/30902
                                                707/E17.12
(Continued)

FOREIGN PATENT DOCUMENTS

CN    101340194    7/2008
CN    102316097    1/2012
(Continued)

OTHER PUBLICATIONS

"AJAX: Asynchronously Moving Forward", InterAKT online, retrieved from the internet at URL>http://www.Interaktlonline.com, pp. 1-11.
(Continued)

*Primary Examiner* — Dhairya A Patel
(74) *Attorney, Agent, or Firm* — David W. Victor; Konrad, Raynes, Davda and Victor LLP (57) ABSTRACT

Provided are a computer program, method, and system for determining and assigning a default value to a current server response if the current server response is not received from the server within a time-limit. An indication of a submission of a request is transmitted to the server for receiving a current server response. A default value is assigned to the current server response if the current server response is not received from the server within a time-limit with respect to the current submission of the request. A set of operations being performed from the assignment of the default value to the current server response is logged. An actual value of the
(Continued)

current server response is received from the server and the logged operations are rolled-back and the current server response reset to the actual value if the actual value is different from the default value.

25 Claims, 5 Drawing Sheets

(56) References Cited

U.S. PATENT DOCUMENTS

| | | | |
|---|---|---|---|
| 7,343,396 | B2 | 3/2008 | Kausik et al. |
| 7,958,429 | B2 | 6/2011 | Lin et al. |
| 8,171,375 | B2 | 5/2012 | Lin et al. |
| 8,850,520 | B1* | 9/2014 | Pike .................. G06F 21/33 709/201 |
| 8,965,860 | B2* | 2/2015 | Cheenath ........... G06F 17/3038 707/703 |
| 2004/0078756 | A1 | 4/2004 | Napper et al. |
| 2007/0100967 | A1 | 5/2007 | Smith et al. |
| 2009/0013237 | A1 | 1/2009 | Lin et al. |
| 2009/0049243 | A1 | 2/2009 | Dubrovsky et al. |
| 2009/0094377 | A1 | 4/2009 | Zahavi et al. |
| 2010/0069053 | A1* | 3/2010 | Chen .................. G06F 8/65 455/418 |
| 2010/0138485 | A1 | 6/2010 | Chow et al. |
| 2010/0169465 | A1 | 7/2010 | Amidon et al. |
| 2010/0228737 | A1 | 9/2010 | Riemers |
| 2011/0202816 | A1 | 8/2011 | Lin et al. |
| 2012/0284320 | A1 | 11/2012 | Dlott et al. |
| 2012/0284329 | A1 | 11/2012 | van den Oord et al. |

FOREIGN PATENT DOCUMENTS

| | | |
|---|---|---|
| EP | 1026608 | 9/2000 |
| EP | 1909202 | 9/2008 |
| JP | 2004078756 | 3/2004 |

OTHER PUBLICATIONS

"13 Caching in HTTP", (online), retrieved from the Internet at URL>http://www.w3.org/Protocols/rfc2616/rfc2616-sec13.html, pp. 1-17.

M. Travi, "Responsive Web Application Using Ajax", pp. 1-6, published on Internet at least as of Mar. 10, 2011.

T. Nakamura, "Client Monitoring Technique with High Installability and Scalability", dated Nov. 2007, Ajax Logger, Hitachi Central Research Laboratory, pp. 1-9.

U.S. Pat. No. 7,958,429 is an English counterpart for CN101340194.
U.S. Pat. No. 8,171,375 is an English counterpart for CN101340194.
20090013237 is an English counterpart for CN101340194.
20110202816 is an English counterpart for CN101340194.
Machine Translation for CN102316097, published Jan. 11, 2012, Total 6 pages.
Machine Translation for 101340194, published Jul. 1, 2008 Total 43 pages.
Information Materials for IDS, dated Jul. 8, 2015, Total 4 pages.
Information Materials for IDS, dated Jun. 24, 2015, Total 4 pages.
"Latency Compensation Techniques", dated 2006, Latency Compensation Techniques, in Networking and Online Games: Understanding and Engineering Multiplayer Internet Games, John Wiley & Sons, Ltd, Chichester, UK. doi: 10.1002/047003047X.ch6, Total 17 pages.
German Office Action, dated Jun. 24, 2015, Total 6 pages.
Chinese Office Action, dated Jul. 8, 2015, Total 5 pages.
US Patent Application, dated Feb. 8, 2013, for U.S. Appl. No. 13/763,573, filed Feb. 8, 2013, invented by Vinicio Bombacino et al., Total 34 pages.
Office Action, dated Nov. 20, 2014, for U.S. Appl. No. 13/763,573, filed Feb. 8, 2013, invented by Vinicio Bombacino et al., Total 20 pages.
Response to Office Action, dated Feb. 20, 2015, for U.S. Appl. No. 13/763,573, filed Feb. 8, 2013, invented by Vinicio Bombacino et al., Total 13 pages.
Office Action, dated Jan. 4, 2016, for U.S. Appl. No. 13/763,573, filed Feb. 8. 2013, invented by Vinicio Bombacino et al., Total 17 pages.
Response to Office Action, dated Apr. 4, 2016, for U.S. Appl. No. 13/763,573, filed Feb. 8, 2013, invented by Vinicio Bombacino et al., Total 14 pages.
Final Office Action, dated Jul. 29, 2016, for U.S. Appl. No. 13/763,573, filed Feb. 8, 2013, invented by Vinicio Bombacino et al., Total 13 pages.
Response to Final Office Action, dated Sep. 29, 2016, for U.S. Appl. No. 13/763,573, filed Feb. 8, 2013, invented by Vinicio Bombacino et al., Total 8 pages.
Notice of Allowance, dated Oct. 24, 2016, for U.S. Appl. No. 13/763,573, filed Feb. 8, 2013, invented by Vinicio Bombacino et al., Total 11 pages.

* cited by examiner

DETERMINING AND ASSIGNING A DEFAULT VALUE TO A CURRENT SERVER RESPONSE IF THE CURRENT SERVER RESPONSE IS NOT RECEIVED FROM THE SERVER WITHIN A TIME-LIMIT

CROSS-REFERENCE TO RELATED FOREIGN APPLICATION

This application is a non-provisional application that claims priority benefits under Title 35, United States Code, Section 119(a)-(d) from Italian Patent Application entitled "DISTRIBUTED APPLICATION WITH ANTICIPATION OF SERVER RESPONSES" by Leonardo LANNI, Vinicio BOMBACINO, Andrea TOROSA, and Paolo CAVAZZA, having European Patent Application No. EP12156435, filed on Feb. 22, 2012, which Italian Patent Application is incorporated herein by reference in its entirety.

BACKGROUND OF THE INVENTION

1. Field of the Invention

The present invention relates to a computer program product, system and method for determining and assigning a default value to a current server response if the current server response is not received from the server within a time-limit.

2. Description of the Related Art

Distributed applications are commonplace in modern data-processing systems, especially in the Internet. In a distributed application, a server computer (or simply server) offers a service that may be exploited by a large number of users accessing the server by means of their client computers (or simply clients)—in general remotely through a communication network. In this way, it is possible to partition the distributed application into a processing layer (on its server-side) and a presentation layer (on its client-side). This allows concentrating the processing operations in the server, which shares its resources with all the clients (with a consequent simplification of a management of the distributed application and of the clients). A typical example of distributed application is the access to a web site in the Internet. In this case, the user of each client exploits a web browser (or simply browser) to download desired web pages of the web site. The user may then interact with the web pages for entering data, submitting commands and displaying information.

The interaction with the distributed application involves the submission of a series of user requests on the client (through the web browser, or any other user interface), which are then transmitted to the server. The server processes the user requests and returns corresponding server responses to the client. Generally, after the submission of each user request, the user has to wait until the corresponding server response is returned from the server before continuing the interaction with the distributed application.

A problem of the distributed applications is that the server responses may be received on the client with a relatively long delay from the submission of the corresponding user requests in critical operative conditions. A cause of this delay may be a stress condition of the server, because of either technical issues (i.e., limited resources or malfunctioning) or scalability issues (i.e., high number of clients accessing it). The result is that the server cannot serve the user requests promptly. Another cause of this delay may be limited bandwidth of the communication network, because of either technical issues (i.e., limited infrastructures or broken lines) or scalability issues (i.e., high traffic), which results in the transmission of information between the clients and the server slowing down.

In critical operative conditions the user may have to wait a relatively long time without doing anything. This waiting time may be far longer than expected for a normal service level in standard operative conditions (for example, several tens of seconds against a fraction of seconds). Such delays may annoy the user and degrade the responsiveness and performance of the distributed application.

The above-mentioned problem is generally addressed by increasing the resources of the server and the infrastructures of the communication network, and their redundancy. However, this solution involves high costs and may be impractical in specific situations.

Another solution is to apply caching techniques to the server responses.

Particularly, the caching techniques may be implemented in proxy computers, or simply proxies (close to the clients, between them and the server) and the server responses are saved onto the proxies, so as to be retrieved from them at next submissions of the corresponding user requests (instead of going up to the server again). An example of these caching techniques is described in JP-A-2004078756 (the entire disclosure of which is herein incorporated by reference).

Alternatively, it is also possible to apply the caching techniques in the client (for example, in its web browser) so that the server responses are saved locally onto a cache memory of the client for retrieval for next submissions of the corresponding user requests (without the need of transmitting them to the server). Examples of these caching techniques are described in US-A-2010/0138485, US-A-2009/0094377 and "Caching in HTTP—http://www.w3.org/Protocols/rfc2616/rfc2616-sec13.html" (the entire disclosures of which are herein incorporated by reference). U.S. Pat. No. 7,096,418 (the entire disclosure of which is herein incorporated by reference) describes invalidating server responses in the cache memory of the client when they not up-to-date any longer (so to avoid providing wrong information to the user).

Additionally, as described in U.S. Patent Publication No. 2009/0049243 (the entire disclosure of which is herein incorporated by reference), it is also possible to transmit information about objects relating to the server response that are cached on the client to the server, together with the corresponding user request. In this way, the server response that is returned to the client only comprises a delta with respect to these objects (already available on the client), so as to reduce the amount of information that is transmitted over the communication network. However, the same drawbacks mentioned above are still experienced when this (reduced) server response is late.

SUMMARY

Provided are a computer program, method, and system for determining and assigning a default value to a current server response if the current server response is not received from the server within a time-limit. An indication of a submission of a request is transmitted to the server for receiving a current server response. A default value is assigned to the current server response if the current server response is not received from the server within a time-limit with respect to the current submission of the request. A set of operations being performed from the assignment of the default value to the current server response is logged. An actual value of the current server response is received from the server and the logged operations are rolled-back and the current server response reset to the actual value if the actual value is different from the default value.

BRIEF DESCRIPTION OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

In its general terms, the solution according to one or more embodiments of the present invention is based on the idea of anticipating the server responses on the client when they are late.

Prior art caching techniques, such as those described above (either at the proxy level or at the client level) work with static user requests, whose server responses generally remain the same over time along the different submissions thereof (such as images, backgrounds and symbols). Conversely, these techniques are completely ineffective in the case of dynamic user requests (for example, comprising variable parameters). For such dynamic requests, prior art caching techniques should transmit the user requests to the server every time in order to get fresh server responses corresponding thereto.

Provided are a method, computer program (and corresponding computer program product, and data processing system for interacting with a distributed application on a client-side thereof. In this case, a default value is assigned to a server response for a user request when it is late. Moreover, operations performed against the distributed application afterwards may be rolled-back when an actual value of the server response (being received later on) is different from this default value.

Figure 1:
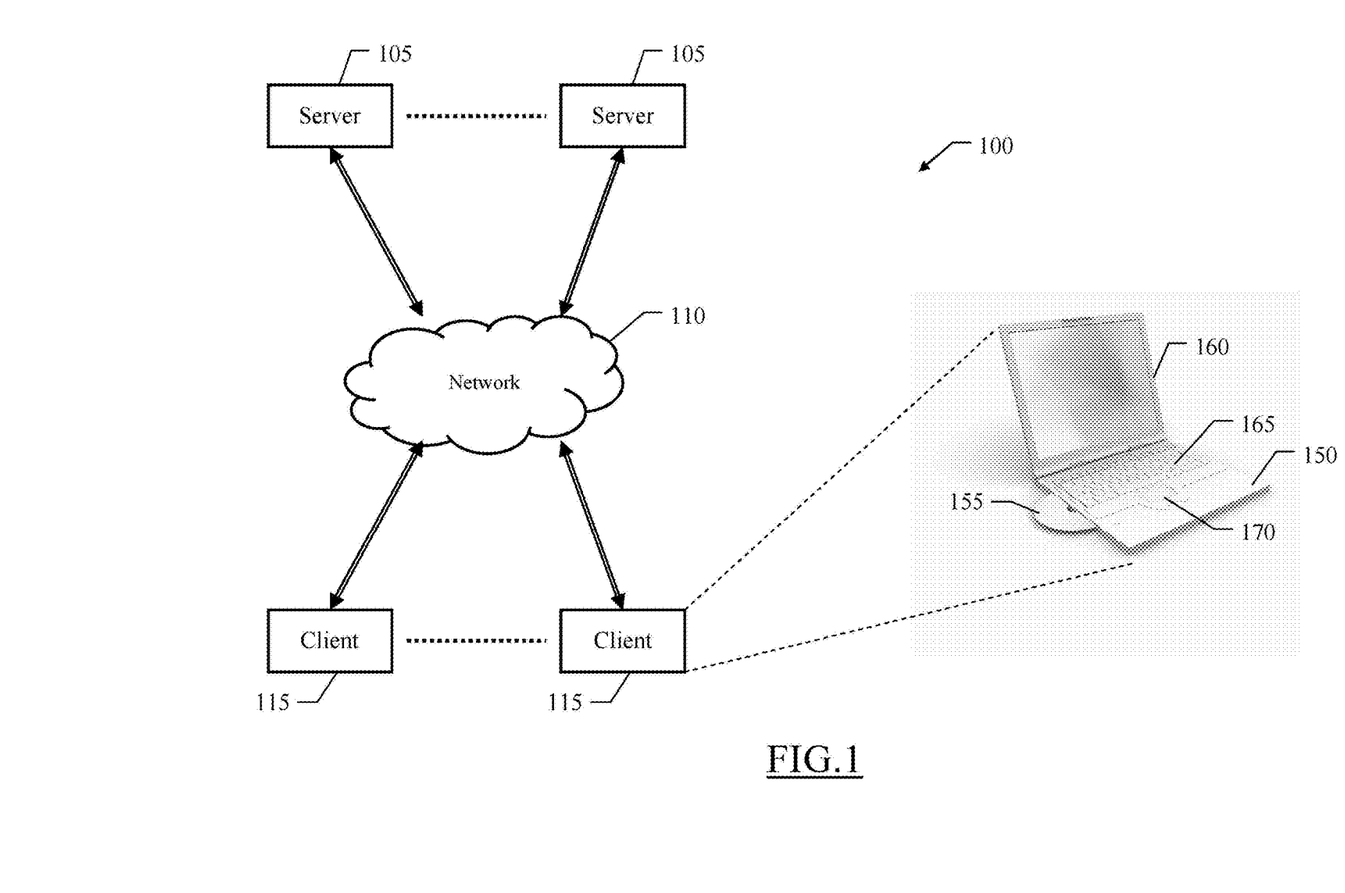
FIG. 1 illustrates an embodiment of a data-processing infrastructure.

With reference in particular to the FIG. 1, a schematic block diagram is shown of a data-processing infrastructure 100 in which the solution according to an embodiment of the invention may be applied.

The data-processing infrastructure 100 has a distributed architecture, typically based on the Internet. The Internet may be formed by millions of server computers (or simply servers) 105, which are connected one to another through a global communication network 110. A subset of the servers 105, known as World Wide Web (or simply web), allows accessing corresponding web sites. Each web site comprises a collection of web pages (connected one to another through corresponding hyper-links, starting from a home page). Each web page is defined by a hypertext document (formatted in the Hyper Text Markup Language (HTML)), which document is accessed through the Hypertext Transport Protocol (HTTP) protocol. A web page is identified and localized by means of a corresponding URL, which consists of a unique string formatted according to a standard syntax. Users of client computers (or simply clients) 115 access the Internet (through computers that operate as access providers, not shown in the figure), in order to exploit the services offered by the servers 105 (and particularly to download desired web pages).

A generic client 115 (for example, consisting of a laptop) comprises a base 150, which houses the electronic circuits controlling its operation. These electronic circuits may comprise a central processing unit, a working memory, a hard-disk, input/output ports (for example, of the USB type), a wireless network adapter (for example, of the Wi-Fi type), and the like. The base 150 is also provided with a drive for reading/writing optical discs 155 (for example, CDs and DVDs). A monitor 160 (used to display images on a screen thereof) is hinged to the base 150. The monitor 160 may be open (in use) and folded down on the base 150 (at rest). Operation of the laptop 115 is controlled by means of a keyboard 165 and a touch-pad 170, which are integrated in the base 150. The laptop 115 may be powered by mains electricity via an AC adapter, but it is commonly used around by means of a rechargeable battery that is mounted in the base 150.

Figure 2:
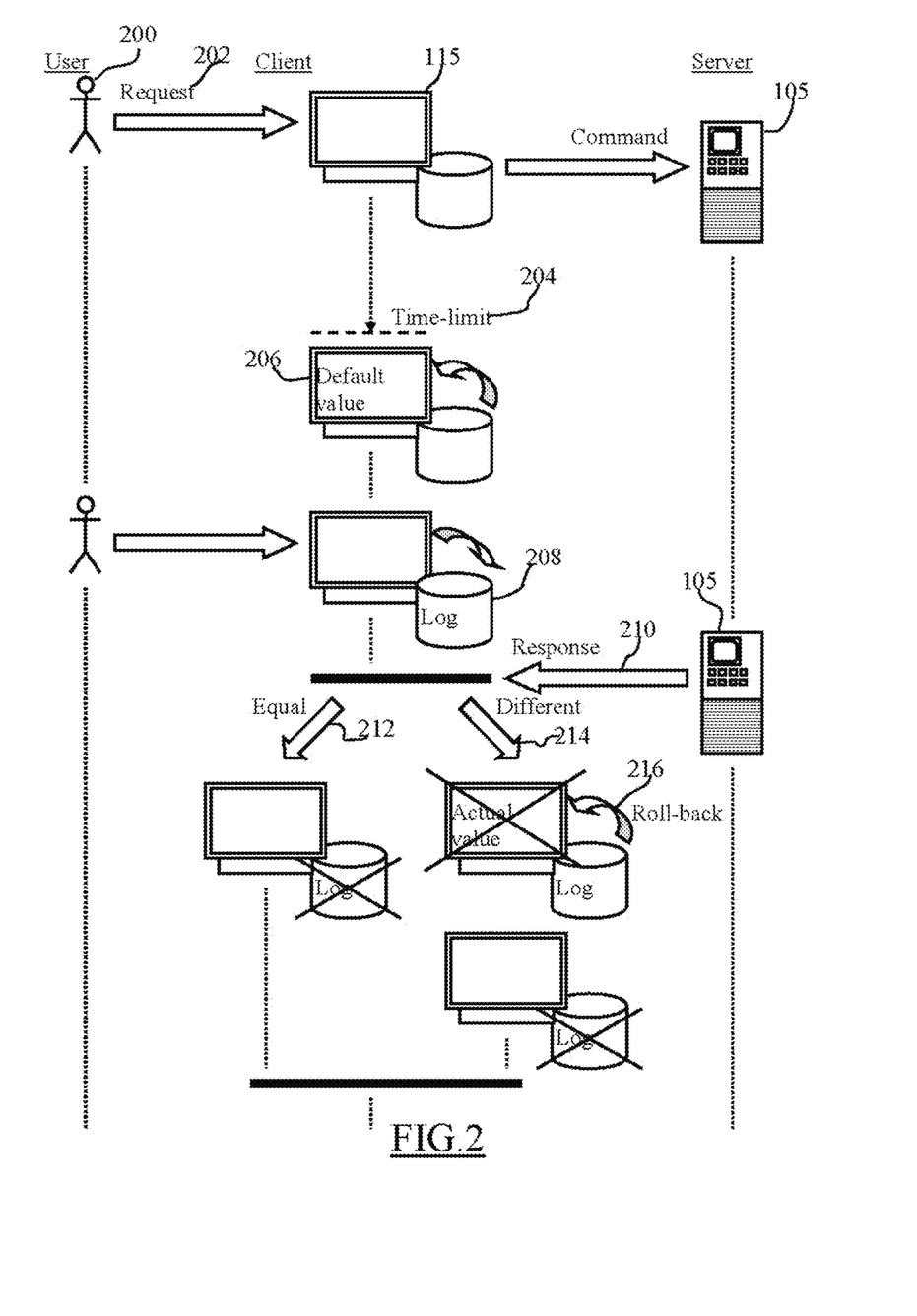
FIG. 2 illustrates an embodiment of an application.

FIG. 2 provides a pictorial representation of an embodiment application.

Particularly, a user 200 of a generic client submits a user request 202 to a client-side 115 of a distributed application (for example, by selecting a command in a web page that is displayed on its monitor). In response thereto, an indication of this user request is transmitted to an associated server 105, which implements a server-side of the same distributed application. The client-side of the distributed application then enters a waiting condition for a server response to this submission of the user request from the server 105 (for example, by displaying an hourglass on the monitor of the client).

In one embodiment, if the server response is not received within a predefined time-limit 204 with respect to the submission of the user request, a default value 206 is assigned thereto (for example, by setting the server response to the value that was received with the highest frequency in the part for the same user request).

The user may then interact with the distributed application normally (as if the server response was already received). However, any operation performed against the distributed application (starting from the assignment of the default value to the server response, comprising it) may be now logged 208 on the client 115.

Later on, an actual value of the server response 210 is received from the server 105.

If the actual value of the server response is equal to the default value that has been assigned thereto previously, then the operation of the distributed application continues normally (with the logged operations that may be deleted).

Conversely, if the actual value of the server response is different 214 from the default value 206 that has been assigned thereto previously, then the logged operations, which have been performed starting from the assignment of the (wrong) default value 206 to the server response, are rolled-back 216, so as to return to the state of the distributed application preceding the assignment of the default value 206 to the server response 210 (with the logged operations that may then be deleted). The server response 210 is then reset to its actual value so as to restore the correct operation of the distributed application.

The described embodiments reduce the user waiting time for critical operative conditions, when the server responses may be received on the client with a relatively long delay from the submission. The delays may result from corresponding user requests (for example, because of a stress condition of the server and/or a small bandwidth of the communication network). In this way, the waiting time may be maintained as expected for a normal service level in standard operative conditions. This increases the responsiveness and performance of the distributed application (since the server responses appear as received in advance to the user).

The above-mentioned advantages are achieved on a statistical basis. Indeed, when the default value is correct (i.e., equal to the actual value), the waiting time of the user is reduced (by the difference between the delay, of the server response with respect to the submission of the user request, and the time-limit). Conversely, when the default value is wrong (i.e., different from the actual value), the waiting time of the user is increased (by the additional time that is wasted to roll-back the logged operations). Therefore, if the default value is properly set, the probability of having the default value correct (and then the waiting time reduced) is far higher than the probability of having it wrong (and the waiting time increased). Moreover, if the server responses have a small impact on the operation of the distributed application (for example, they involve simple refreshes of the web pages with the change of small objects thereof), the increase of the waiting time (for rolling-back the logged operations when the default value is wrong) is far lower than its reduction (when the default value is correct). As a result, the waiting time is reduced on the average. For example, if 10.00 s are saved in 70% of the cases and 1.00 s is lost in the remaining 30% of the cases, the average reduction of the waiting time is equal to 7.70 s.

The above-described result is achieved by acting on the client-side of the distributed application only. Therefore, the described embodiments provide a very high scalability.

Figure 3:
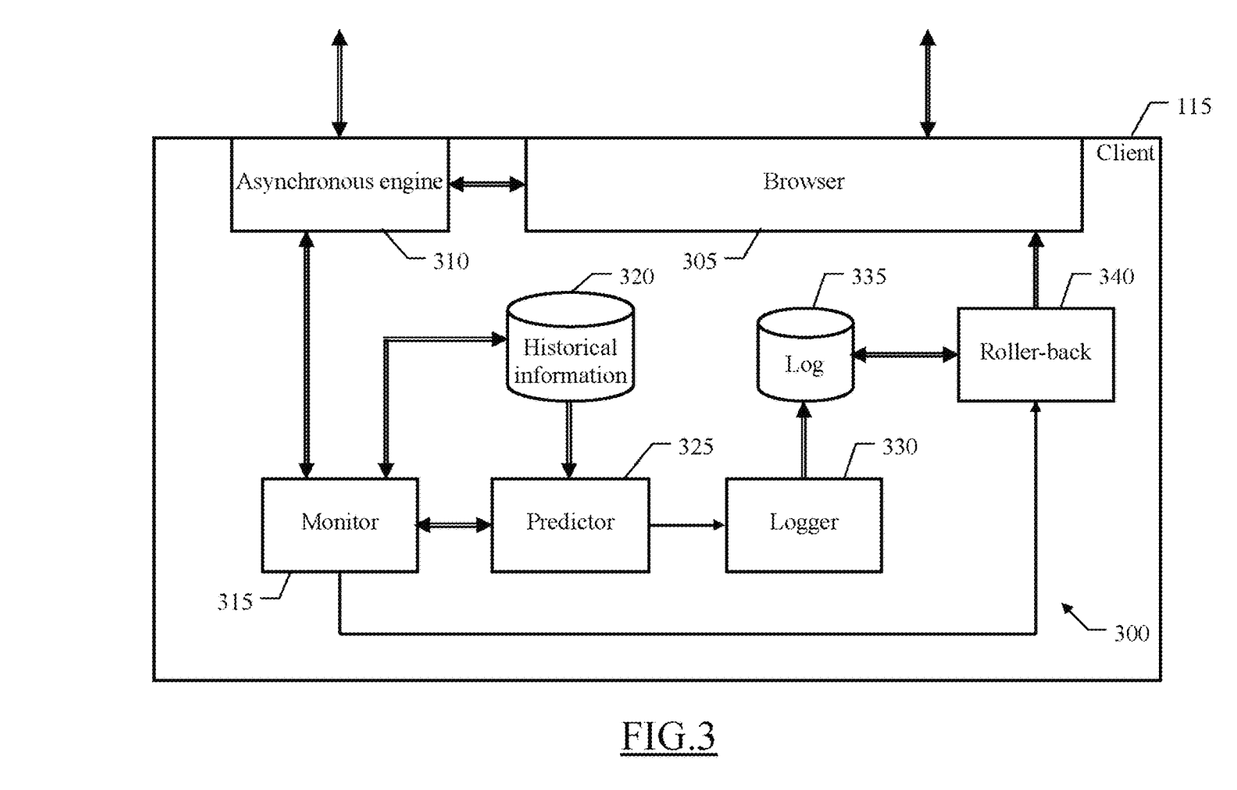
FIG. 3 is an embodiment of software components.

The software components of described embodiments are shown in FIG. 3.

These software components are denoted as a whole with the reference 300. The information (programs and data) is typically stored on the hard-disk and loaded (at least partially) into the working memory of a generic client 115 when the programs are running, together with an operating system and other application programs (not shown in the figure). The programs are initially installed onto the hard-disk, for example, from optical disks.

Particularly, a web browser (or simply browser) 305 is used to surf the Internet by a user of the client 115. For this purpose, the browser 305 allows the user to enter the URLs of desired web pages, which are then downloaded onto the client for their display (from corresponding servers, not shown in the figure); moreover, the browser 305 allows the user to move quickly to other web pages (in the same web site or in a different one) by means of corresponding hyperlinks. The user may interact locally with each web page in different ways; particularly, the user may submits user requests—for example, by clicking with the mouse on corresponding commands, generally after entering associated parameters (e.g., by filling input fields with the keyboard). Some of these user requests cause the transmission of commands representing them to the corresponding server. Typically, the browser 305 also implements a caching mechanism, wherein server responses to static user requests are saved onto a cache memory of the browser. In this way, when the a same (static) user request is submitted again in the future, the corresponding server request may be retrieved directly from the cache memory (without the need of transmitting its command to the server again).

With reference instead to dynamic user requests (requiring the transmission of their commands to the server every time in order to get fresh server responses), the browser 305 may exploit an asynchronous engine 310 that has been previously downloaded together with the web page. For example, the asynchronous engine 310 may be based on the Ajax technology, as described in "Ajax: Asynchronously moving forward—http://www.interaktonline.com/files/art/ajax/AJAX%20-%20Asynchronously%20Moving%20Forward.pdf", "Responsive web applications using Ajax—http://travi.org/about/AjaxSurvey.pdf" and "Ajax logger client monitoring technique with high installability & scalability—http://www.usenix.org/event/lisa07/posters/nakamura.pdf". In this case, for each submission of a user request the browser 305 sends, a corresponding script call to the asynchronous engine 310—for example, by means of a wrapper (such as based on the Dojo toolkit), which abstracts corresponding objects around various implementations of the browser 305. The script call is not blocking, so that the user may continue interacting with the web page. The asynchronous engine 310 transmits the command representing the user request to the server; as soon as the server response to this submission of the user request is received from the server, the asynchronous engine 310 returns the response to the browser 310 that updates a corresponding portion of the web page (without reloading it entirely). In this case, if the browser 305 implements the caching mechanism, this is by-passed by adding a unique code to the submission of the user request (for example, based on a current time-stamp or a random number), so as to prevent the browser 305 from retrieving the corresponding server response from the cache memory.

In the certain embodiments, the asynchronous engine 310 is expanded with a monitor 315. The monitor 315 interacts with the asynchronous engine 310 to monitor the submissions of the user requests (or at least part of them) and the corresponding server responses. Moreover, the monitor 315 measures the delays of the server responses with respect to the corresponding submissions of the user requests. The monitor 315 saves corresponding historical information onto a repository 320. For example, the historical information 320 may comprise a frequency table for each key defined by a pair <user request/server response value>. The frequency table may store a counter of the number of times this value of the server response has been received for this user request. Moreover, the historical information 320 may comprise a delay table. For each key defined by a user request, the delay table stores an average of the delays with which all the server responses have been received for this user request. If the submissions of the same user request comprise different unique codes (to by-pass the caching mechanism of the browser 305), these unique codes are discarded in the keys of the frequency table and the delay table (so as to avoid considering them as different user requests).

The asynchronous engine 310 is further expanded with a predictor 325. The monitor 305 interacts with the predictor 325 for retrieving the default value to be assigned to each server response that is not received in time by the asynchronous engine 310. The predictor 325 accesses the repository 320 for setting the default value according to the corresponding historical information. The predictor 325 in turn controls a logger 330, which logs any operation, performed against the web page starting from the assignment of the default value to each server response, onto a corresponding repository 335.

The monitor 315 also compares the actual value of each server response that is received from the server 105 after the default value has been assigned thereto with this default value. The asynchronous engine 310 is further expanded with a roller-back 340, which is controlled by the monitor 315. For each server response whose actual value is different from the default value, the roller-back 340 accesses the repository 335 for rolling-back the corresponding logged operations in the browser 305 (and then deleting them).

The above-described embodiments may be implemented as scripts that are supported natively by the browser 305. In this case, the scripts are generally executed in a sandbox (which provides a tightly controlled set of resources for their execution in the client 115, particularly preventing the writing of any files onto its mass memory) and the required information is stored onto the cache memory of the browser 305. Alternatively, the same modules may be implemented as certified applets, or as a plug-in of the browser 305 (so as to be able to store the required information onto the mass memory of the client 115).

Figure 4A:
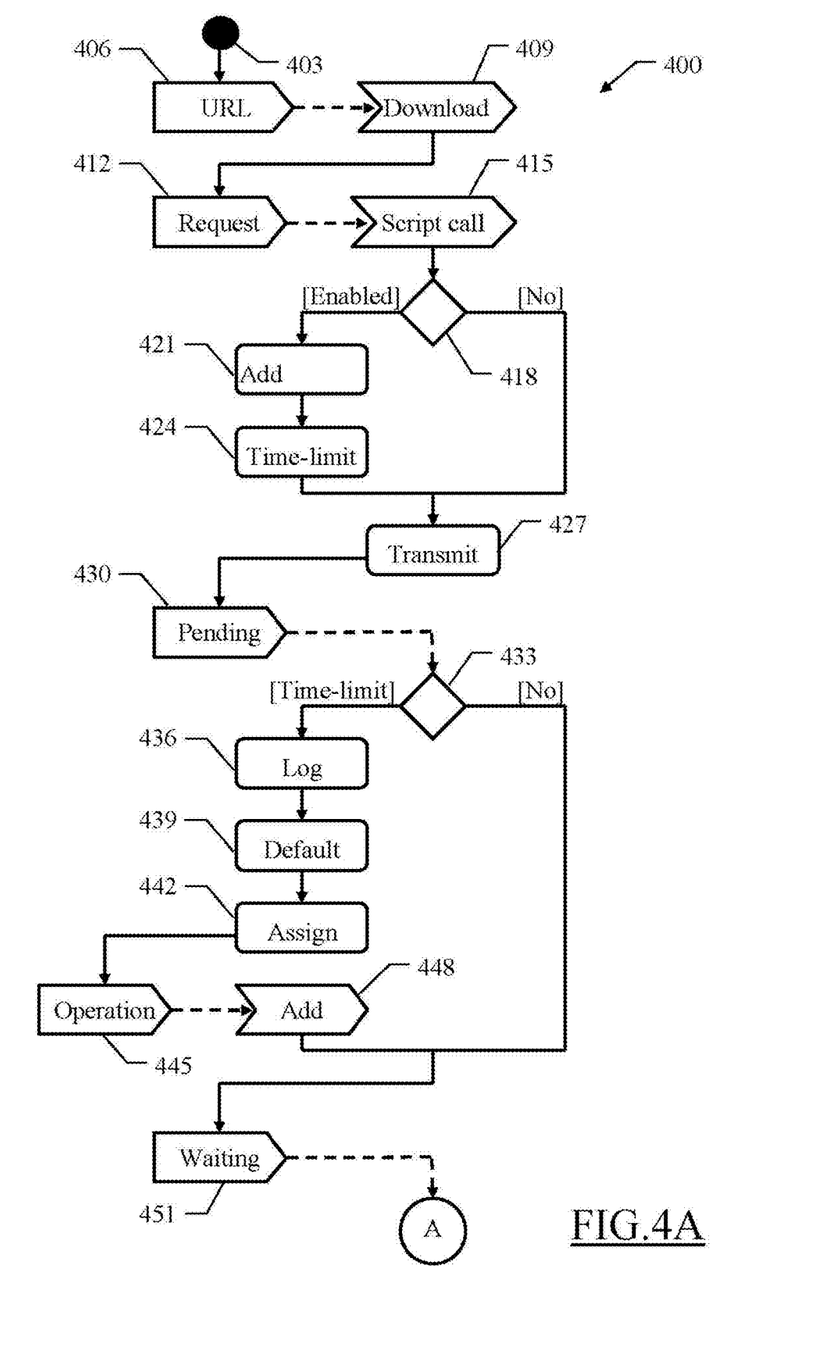
FIG. 4A-FIG. 4B are embodiment of a flow diagram.
Figure 4B:
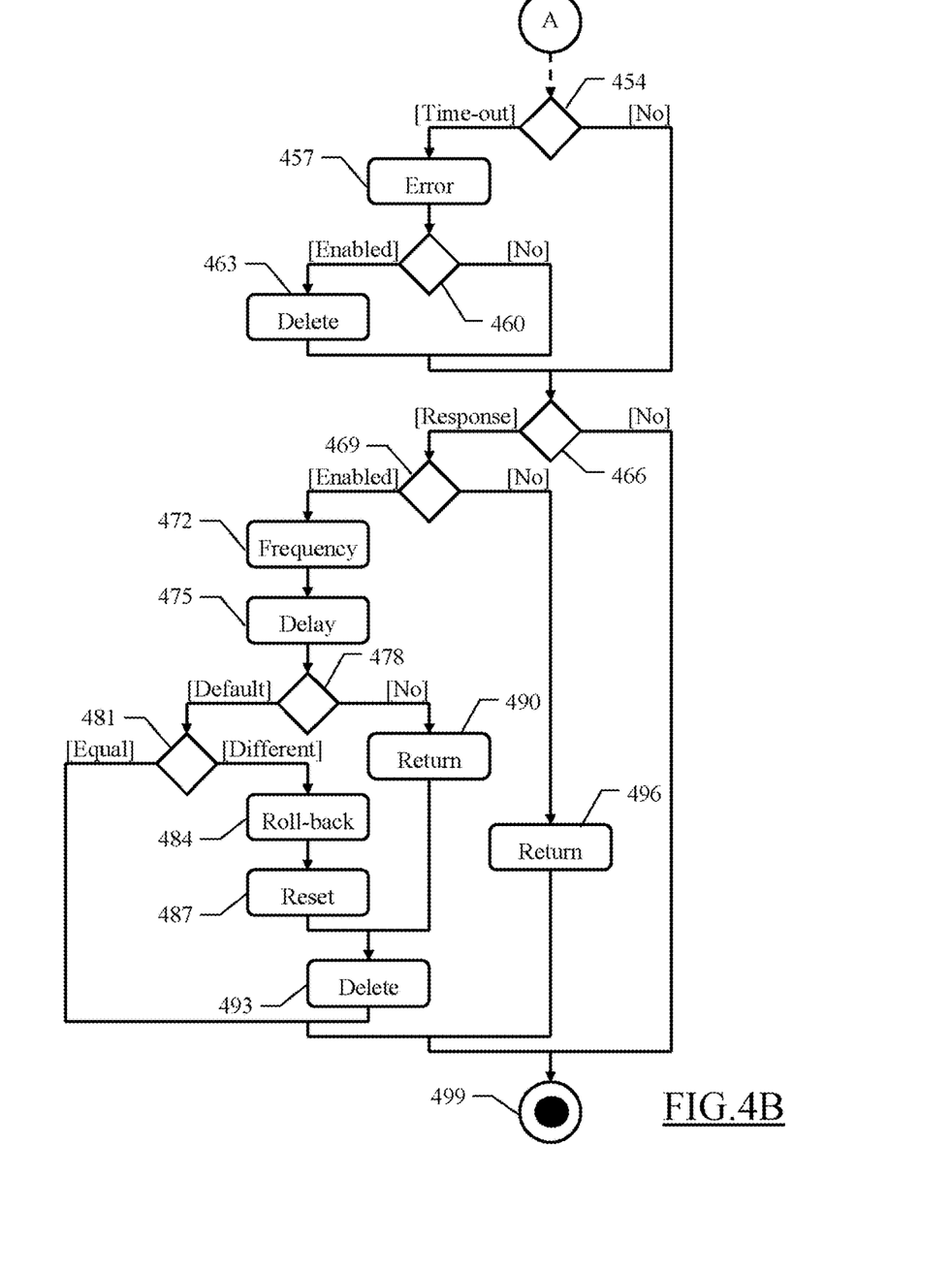

An activity diagram describing the flow of activities in an embodiment is shown in the FIG. 4A-FIG. 4B.

Particularly, the diagram represents an exemplary process that may be implemented for interacting with a generic distributed application on a client-side thereof with a method 400. The method 400 begins at the black start circle 403, and then passes to block 406 as soon as a desired web page is requested to the browser 305 (for example, by launching it and then entering the URL of the web page into an address box thereof). In response to this action, the browser 305 at block 409 downloads the HTML definition of the web page from its server 105 (by sending a corresponding command thereto). The browser 305 then renders the web page into a dedicated window by interpreting its HTML definition, and it loads any scripts associated with the web page (comprising the asynchronous engine as extended above).

The flow of activity passes to block 412 as soon as the user of the client submits a user request that involves any interaction with the server 105 (for example, for displaying a graphic to be downloaded therefrom into the web page). In response thereto, the browser 330 at block 415 sends a call for a script corresponding to the user request to the asynchronous engine 310. In response thereto, the asynchronous engine at block 418 verifies an enablement of the above-described anticipating feature for this user request (for anticipating its server response when late). For example, the anticipating feature may be enabled by asserting an anticipating flag in the script. In this way, it is possible to enable the anticipating feature selectively only when it is desirable. The anticipating feature may be enabled for user requests whose server responses change with a certain regularity and/or in a relatively slow way (so that their default values may be predicted with an acceptable degree of accuracy). The anticipating feature may be disabled for user requests whose server responses are completely unpredictable or are absolutely needed with their correct values.

If the anticipating feature is enabled (i.e., the anticipating flag is asserted), then the method 400 descends into block 421 wherein the monitor 315 adds a record for this current submission of the user request to a pending table (of the current submissions of the user requests that are pending in the monitor—i.e., having the anticipating feature enabled, and waiting for the corresponding current server responses). The record comprises a time stamp of the current submission of the user request and a default flag (initially deasserted) that indicates whether the default value has been assigned to the corresponding current server response. Moreover, the monitor 315 at block 424 sets the time-limit for receiving the current server response according to the corresponding historical information. This time-limit may be set to a predefined multiple of the corresponding average delay (as indicated for the user request in the delay table, which is queried by discarding the unique code of the current submission of the user request used to by-pass the caching mechanism of the browser)—such as 1-3 times the average delay, but below a general time-out of the browser for the server responses. The method 400 then continues to block 427 or from the block 418 when the anticipating feature is disabled (i.e., the anticipating flag is deasserted). At this point, the asynchronous engine 310 connects to the server 105 by transmitting the command corresponding to the user request, and listens on a corresponding socket waiting for receiving the current server response to the current submission of the user request.

The monitor 315 at block 430 continually polls the current submissions of the user requests, having the anticipating feature enabled, that are waiting for the corresponding current server responses (as indicated in the pending list), but that have not been assigned to the default value yet (i.e., default flag deasserted). For each one of these current submissions of the user requests, at block 433 the monitor 315 verifies whether the corresponding time-limit (as indicated in the pending table) has expired. If so, the flow of activity descends into block 436 where the predictor 325 enables the logging of the operations that are performed against the current web page in the browser, by creating a corresponding record in a log 335 table. The predictor 325 at block 439 then sets the default value of the current server response (to this current submission of the user request) according to the corresponding historical information 320. Particularly, the default value is set to the value of the server response that has been received the highest number of times for the user request (as indicated for the user request in the frequency table, which is queried by discarding the unique code of the current submission of the user request used to by-pass the caching mechanism of the browser). In this way, the setting of the default value is based on a probabilistic approach, which provides the default value that is most likely to be correct.

For this purpose, when for each pair <user request/server response value> the frequency table stores the counter of the number of times this value of the server response has been received for this user request, the predictor 325 queries the frequency table on the key defined by the user request, for the record with the highest counter. For example, the following frequency table relates to a user request U1, for which the values S1, S2, S3, S4, S5 and S6 of the previous server responses to its previous submissions have been returned 2, 3, 7, 4, 1 and 2 times, respectively:

| <user request/server response value> | Counter |
| --- | --- |
| <U1/S3> | 7 |
| <U1/S4> | 4 |
| <U1/S2> | 3 |
| <U1/S1> | 2 |
| <U1/S6> | 2 |
| <U1/S5> | 1 |

In this case, the default value of the current server response for the current submission of the user request U1 is set to value S3.

In a different embodiment, for each pair <user request/server response value> the frequency table comprises one or more groups of records. Each one of these groups comprises multiple records for different values of a corresponding submission characteristic of the previous submissions of the user request (for example, a time frame thereof). Each record then stores the counter of the number of times this value of the server response has been received for this user request, when its previous submissions matched its value of the corresponding submission characteristic. For example, the following frequency table relates to a user request U1, for which the values S1, S2 and S3 of the previous server responses have been returned 8, 2 and 1 times, respectively, on Monday-Friday, and the values S1, S4, S2 of the previous server responses have been returned 3, 2 and 7 times, respectively, on Saturday-Sunday:

| <user request/server response value> | Time frame | Counter |
|---|---|---|
| <U1/S1> | Monday-Friday | 8 |
| <U1/S2> | Monday-Friday | 2 |
| <U1/S3> | Monday-Friday | 1 |
| <U1/S2> | Saturday-Sunday | 7 |
| <U1/S1> | Saturday-Sunday | 3 |
| <U1/54> | Saturday-Sunday | 2 |

The predictor 325 then queries the frequency table on the key defined by the user request and the value of the submission characteristic of the current submission of the user request, for the record with the highest counter. For example, in this case the default value of the current server response for the current submission of the user request U1 is set to the value S1 if it is submitted on Monday-Friday, whereas it is set to the value S2 if it is submitted on Saturday-Sunday.

The above-described implementation also takes into account the trend of the previous server responses for setting the default value of the current server response to improve the accuracy of the prediction of the default value in several practical situations. For example, if the user request is for verifying a status of a remote server 105 (by means of a ping command to its hostname), it is possible that this remote server 105 is generally available during the working days and generally non-available during the non-working days (because of maintenance operations).

Continuing to block 442, the predictor 325 returns the determined default value to the monitor 315, which assigns the default value to the current server response. At the same time, the default value is saved into the corresponding record in the pending table, and its default flag is asserted. The monitor 315 then returns the current server response to the asynchronous engine 310, which in turn returns it to the browser 305.

As soon as a next operation is performed against the web page by the browser 305 at block 445, the logger 330 at block 448 adds an indication thereof in the corresponding record of the log table 335. In one embodiment, this operation is performed immediately when the browser 305 receives the current server response (at the default value) from the asynchronous engine 310 and updates a corresponding portion of the web page (for example, by displaying the requested graphic based on this default value).

The method 400 then continues to block 451, which is also reached from block 433 if the time-limit of the current submission of the user request has not expired.

In an asynchronous manner, the asynchronous engine 310 may continually poll the current submissions of the user requests that are waiting for the corresponding current server responses (i.e., still listening on the corresponding sockets). For each one of these current submissions of the user requests, the asynchronous engine 310 at block 454 verifies whether the general time-out has expired. If so, the flow of activity descends into block 457 wherein an error condition is entered (and the corresponding connection with the server is closed) and the asynchronous engine 310 then returns an error code to the browser 305, which displays a corresponding error message to the user (for example, in a pop-up window). Moreover, at block 460 the asynchronous engine 310 verifies the enablement of the anticipating feature for the user request (as indicated by the anticipating flag in its script). If the anticipating feature is enabled (i.e., the enabling flag is asserted), at block 463 the logger deletes the log record of the current submission of the user request (if any—i.e., when the default flag is asserted), and the monitor 315 deletes the corresponding record from the pending list. The flow of activity merges again at block 466 from the block 463, from the block 460 (when the user request has not the anticipating feature enabled) or from the block 454 (when the general time-out has not expired).

At this point, the asynchronous engine 310 verifies whether the current server 105 response to the current submission of the user request has been received. If so, at block 469 the asynchronous engine further verifies the enablement of the anticipating feature for the user request (as indicated by the anticipating flag in its script). If the anticipating feature is enabled (i.e., the enabling flag is asserted), the method 400 descends into block 472 wherein the monitor 315 updates the frequencies of the different values of the server responses to the user request accordingly. For example, for this purpose the monitor 315 verifies whether a record exists in the frequency table for the user request (discarding the unique code of the current submission of the user request used to by-pass the caching mechanism of the browser) and the value of the current server response. If a record does not exist, a new record for the pair <user request/server response value> is added and its counter is initialized to 0, whereas on the contrary the counter of the corresponding record is incremented by 1. The records of the frequency table are sorted in decreasing order of the counter for each user request. Proceeding to block 475, the monitor 315 also updates the average delay of the user request accordingly. For example, for this purpose, the monitor 315 verifies whether a record exists in the delay table for the user request (discarding the unique code of the current submission of the user request used to by-pass the caching mechanism of the browser). If not, a new record for the user request is added and its average delay is initialized to a current delay of the current server response with respect to the current submission of the user request, whereas conversely the counter of the corresponding record is recalculated to take into account this current delay.

The flow of activity then branches at block 478 according to the assignment of the default value to the current server response (as indicated by the corresponding default flag in the pending table). If the default value has been previously assigned to the current server response (i.e., the default flag is asserted) the blocks 481-487 are executed, whereas on the contrary the block 490 is executed.

Considering now the block 481 (default value assigned), the monitor 315 verifies whether the default value (extracted from the corresponding record of the pending table) matches the actual value of the current server response that has just been received. If the default value is different from the actual value, the method 400 descends into block 484; in this phase, the roller-back retrieves the logged operations, which has been performed on the web page starting from the assignment of the (wrong) default value to the current server response, in succession from the corresponding record in the log table (starting from the most recent one and then going back in time), and it undoes them in the browser; once the process has been completed, this record may be deleted from the log table (thereby disabling the logging of the operations performed against the web page). Continuing to block 487, the asynchronous engine 310 resets the current server response to its actual value; the current server response is returned again to the browser 305, which now updates the corresponding portion of the web page correctly (for example, by displaying the requested graphic with its real content).

With reference instead to the block 490 (default value not assigned), the asynchronous engine 310 directly returns the current server response to the browser 305, which updates the corresponding portion of the web page as above.

The flow of activity then merges again at block 492 (from either the block 487 or the block 490). In this phase, the monitor 315 deletes the corresponding record from the pending table.

Referring back to the block 469, if the anticipating feature for the user request is not enabled (i.e., the enabling flag is deasserted), the method 400 descends into block 496. In this case as well, the asynchronous engine 310 directly returns the current server response to the browser, which updates the corresponding portion of the web page.

The method 400 then ends at the concentric white/black stop circles 499, from the block 493, from the block 496, from the block 481 (when the default value is equal to the actual value) or from the block 466 (when the current server response has not been received).

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variable involved), and the term a/an should be intended as one or more items (unless expressly indicated otherwise).

For example, an embodiment provides a method for interacting with a distributed application on a client-side of the distributed application (of any type, see below). The method comprises the following steps. A current submission of a user request is received (of any type, see below). An indication of the user request is transmitted to a server-side of the distributed application, in order to receive a current server response to the current submission of the user request (of any type, see below). A default value (of any type, see below) is assigned to the current server response if the current server response is not received from the server-side within a time-limit with respect to the current submission of the user request (of any value, see below). A set of operations, which are performed against the distributed application starting from the assignment of the default value to the current server response, is logged (in any way, for example, in one or more temporary files). An actual value of the current server response is received from the server-side. The logged operations are rolled-back, and the current server response is reset to the actual value if the actual value is different from the default value.

However, similar considerations apply if the same solution is implemented with an equivalent method (by using similar steps with the same functions of more steps or portions thereof, removing some steps being non-essential, or adding further optional steps). Moreover, the steps may be performed in a different order, concurrently or in an interleaved way (at least in part).

In one embodiment, the step of assigning a default value to the current server response comprises setting the default value according to previous server responses being received from the server-side for previous submissions of the user request.

However, the possibility of setting the default value in a different way is not excluded (for example, simply to a pre-defined value that is known a priori to be the most likely in most practical situations, or to the last server response that is received for the same user request).

In one embodiment, the step of setting the default value according to previous server responses comprises setting the default value according to at least one frequency distribution of values of the previous server responses.

However, the default value may be set according to whatever statistical analysis of the previous server responses (for example, based on fuzzy logic).

In one embodiment, the at least one frequency distribution is a single frequency distribution of the values of the previous server responses and the step of setting the default value according to at least one frequency distribution comprises setting the default value to the value of the previous server responses having a highest frequency in the frequency distribution.

However, different rules may be used to set the default value, for example, with the frequency distribution that is created by assigning different weights to the previous server responses according to their age.

In a further embodiment, the at least one frequency distribution is a set of one or more groups of frequency distributions, each one of a plurality of frequency distributions of the values of the previous server responses. Each group is for a corresponding submission characteristic of the previous submissions of the user request, and the frequency distributions thereof are for different values of the corresponding submission characteristic. The step of setting the default value according to at least one frequency distribution comprises setting the default value to the value of the previous server responses, which has a highest frequency in the frequency distribution of each group matching the value of the corresponding submission characteristic of the current submission of the user request.

However, any number of groups of frequency distributions may be provided. Further, other criteria based on one or more submission characteristics of the user requests may be used for setting the default value (for example, based on a combined probability of the default values in the different groups of frequency distributions). Moreover, it is also possible to learn a decision tree from the previous server responses, which decision tree is then used to classify the current submission of the user request into one of a plurality of disjoint classes associated with different default values according to its submission characteristics.

In one embodiment, the submission characteristics comprise a time frame of the submissions of the user request.

However, the time frame may be defined in another way (for example, at the level of hours of the days). Further, whatever characteristics of the submissions of the user requests, or combinations thereof, may be taken into account (for example, a geographical location of the clients).

In a further embodiment, the method further comprises the step of entering an error condition if the current server response is not received from the server-side within a further time-limit with respect to the current submission of the user request; the further time-limit is higher than said time-limit.

However, any other action may be taken when the server response is not received in time (for example, simply rolling-back the logged operations).

In a further embodiment, the method further comprises the step of setting the time-limit and/or the further time-limit according to previous delays of the previous server responses with respect to the previous submissions of the user request.

However, this process may be applied to the time-limit only, to the further time-limit only, to both of them, or even to none of them (for example, when they are defined in the corresponding scripts or they are pre-defined to fixed values). The time-limit and/or the further time-limit may be defined in any other way with respect to the current submission of the user request (for example, starting from its submission on the client or from its transmission to the server).

In a further embodiment, the step of receiving a current submission of a user request comprises detecting a selection of a corresponding user command in a web page by a web browser; the method further comprises the step of displaying an indication of the current server response in the web page or in a further web page by the web browser.

However, the distributed application may be of any type, even not based on the Internet (for example, implementing database accesses or performance monitors). Moreover, the client-side of the distributed application may be of any type, even not web-based (for example, implemented by a dedicated program or an agent). Likewise, it is possible to have different types of the server-side of the distributed application (for example, database or monitoring servers) and of the server responses (for example, tables or reports).

In a further embodiment, the step of transmitting an indication of the user request to a server-side of the distributed application comprises calling a corresponding script comprised in a definition of the web page. The steps of assigning a default value to the current server response, logging a set of operations, rolling-back the logged operations and resetting the current server response to the actual value are enabled in response to a corresponding indicator comprised in the script.

However, this anticipating feature may be enabled selectively in other ways (for example, by means of corresponding cookies). Further, the anticipating feature may be enabled selectively at the level of categories of user requests, or indiscriminately for all of them.

In a further embodiment, the current submission of the user request comprises a unique code for disabling a caching mechanism of the browser. The method further comprises the step of discarding the unique code for setting the default value.

However, the unique code of the submissions of the user requests may be discarded in a different way (for example, by means of filtered queries). Further, this feature may be omitted when the browser does not implement any caching mechanism.

A further embodiment provides a computer program, which comprises code means for causing a data-processing system (of any type, see below) to perform the steps of the above-described method when the computer program is executed on the data-processing system.

However, the same solution may be implemented as a stand-alone module, as a plug-in for the browser (or any other client-side of the distributed application), or even directly in the browser itself. In any case, similar considerations apply if the program (which may be used to implement each embodiment of the invention) is structured in a different way, or if additional modules or functions are provided. Likewise, the memory structures may be of other types, or may be replaced with equivalent entities (not necessarily consisting of physical storage media). The program may take any form suitable to be used by any data-processing system or in connection therewith (for example, within a virtual machine) to configure the system to perform the desired operations. The program may be in the form of external or resident software, firmware, or micro-code (either in object code or in source code—for example, to be compiled or interpreted). Moreover, it is possible to provide the program on any computer-usable medium (and particularly as an article of manufacture on a non-transitory medium). The medium may be any element suitable to contain, store, communicate, propagate, or transfer the program. For example, the medium may be of the electronic, magnetic, optical, electromagnetic, infrared, or semiconductor type. Examples of such medium are fixed disks (where the program may be pre-loaded), removable disks, tapes, cards, wires, fibers, wireless connections, networks, broadcast waves, and the like. Described embodiments may further be implemented with a hardware structure (for example, integrated in a chip of semiconductor material), or with a combination of software and hardware suitably programmed or otherwise configured.

A further embodiment provides a data-processing system (i.e., a client), which comprises means for performing the steps of the same method.

However, similar considerations apply if the client has a different structure or comprises equivalent components, or it has other operative characteristics. In any case, every component thereof may be separated into more elements, or two or more components may be combined together into a single element. Moreover, each component may be replicated to support the execution of the corresponding operations in parallel. It is also pointed out that (unless specified otherwise) any interaction between different components generally does not need to be continuous, and it may be either direct or indirect through one or more intermediaries. In any case, the client may have another structure or may comprise similar elements (such as cache memories temporarily storing the programs or parts thereof). Moreover, it is possible to replace the computer of the client with any code execution entity, either based on a physical machine or a virtual machine (such as a desktop, a PDA, a mobile phone, and the like). The same solution may also be applied in a data-processing infrastructure based on a different architecture (for example, a local, wide area, cellular or satellite network), and exploiting any type of (wired and/or wireless) connections.

What is claimed is:

1. A non-transitory computer usable medium having a computer program executed by a data processing system to communicate with a server and to perform operations, the operations comprising:
   receiving a current submission of a request;
   transmitting an indication of the request to the server for receiving a current server response to the current submission of the request;
   assigning a default value to the current server response for the request if the current server response is not received from the server within a time limit with respect to the current submission of the request, wherein the default value is assigned to increase responsiveness to the request by avoiding delays beyond the time limit;
   logging a set of operations being performed from the assignment of the default value to the current server response;
   receiving an actual value of the current server response from the server;
   rolling-back the logged operations and resetting the current server response to the actual value if the actual value is different from the default value; and
   using the actual value in response to resetting the current server response to the actual value.

2. The non-transitory computer usable medium of claim 1, wherein the assigning the default value to the current server response comprises:
   setting the default value according to previous server responses being received from the server for previous submissions of the request.

3. The non-transitory computer usable medium of claim 2, wherein the setting the default value according to previous server responses comprises:
   setting the default value according to at least one frequency distribution of values of the previous server responses.

4. The non-transitory computer usable medium of claim 3, wherein the at least one frequency distribution is a single frequency distribution of the values of the previous server responses, wherein the setting the default value according to at least one frequency distribution comprises setting the default value to a value of the previous server responses having a highest frequency in the frequency distribution.

5. The non-transitory computer usable medium of claim 3, wherein the at least one frequency distribution comprises a separate frequency distribution for each of a plurality of submission characteristics of the previous submissions of the request, wherein the setting the default value according to the at least one frequency distribution comprises setting the default value to a value of the previous server responses having a highest frequency in the frequency distribution for the submission characteristics of the current submission of the request.

6. The non-transitory computer usable medium of claim 5, wherein the submission characteristics comprise a time frame of the previous submissions of the request, wherein the frequency distribution for each time frame provides different frequency for the time frame.

7. The non-transitory computer usable medium of claim 1, wherein the time limit comprises a first time limit, wherein the operations further comprise:
   entering an error condition if the current server response is not received from the server within a second time limit with respect to the current submission of the request, wherein the second time limit is higher than the first time limit.

8. The non-transitory computer usable medium of claim 1, wherein the operations further comprise:
   setting the time limit according to previous delays of the previous server responses with respect to previous submissions of the request.

9. The non-transitory computer usable medium of claim 1, wherein the receiving of a current submission of a request comprises detecting a selection of a corresponding command in a web page by a web browser, wherein the operations further comprise:
   displaying an indication of the current server response in the web browser.

10. The non-transitory computer usable medium of claim 9, wherein the transmitting the indication of the request to the server comprises calling a corresponding script in a definition of the web page, wherein the steps of assigning the default value, logging the set of operations, rolling-back the logged operations, and resetting the current server response are performed in response to executing a corresponding indicator in the corresponding script.

11. The non-transitory computer usable medium of claim 9, wherein the current submission of the request comprises a unique code for disabling a caching mechanism of the web browser, wherein the operations further comprise:
   discarding a unique identifier for the default value.

12. A method for interacting with a distributed application on a client-side of the distributed application, comprising:
   receiving a current submission of a request;
   transmitting an indication of the request to a server for receiving a current server response to the current submission of the request;
   assigning a default value to the current server response for the request if the current server response is not received from the server within a time limit with respect to the current submission of the request, wherein the default value is assigned to increase responsiveness to the request by avoiding delays beyond the time limit;
   logging a set of operations being performed against the distributed application starting from the assignment of the default value to the current server response;
   receiving an actual value of the current server response from the server;
   rolling-back the logged operations and resetting the current server response to the actual value if the actual value is different from the default value; and
   using the actual value in response to resetting the current server response to the actual value.

13. The method of claim 12, wherein the assigning the default value to the current server response comprises:
   setting the default value according to previous server responses being received from the server for previous submissions of the request.

14. The method of claim 13, wherein the setting the default value according to previous server responses comprises:
setting the default value according to at least one frequency distribution of values of the previous server responses.

15. The method of claim 14, wherein the at least one frequency distribution is a single frequency distribution of the values of the previous server responses, wherein the setting the default value according to at least one frequency distribution comprises setting the default value to a value of the previous server responses having a highest frequency in the frequency distribution.

16. The method of claim 14, wherein the at least one frequency distribution comprises a separate frequency distribution for each of a plurality of submission characteristics of the previous submissions of the request, wherein the setting the default value according to the at least one frequency distribution comprises setting the default value to a value of the previous server responses having a highest frequency in the frequency distribution for the submission characteristics of the current submission of the request.

17. The method of claim 16, wherein the submission characteristics comprise a time frame of the previous submissions of the request, wherein the frequency distribution for each time frame provides different frequency for the time frame.

18. The method of claim 12, wherein the receiving of a current submission of a request comprises detecting a selection of a corresponding command in a web page by a web browser, further comprising:
displaying an indication of the current server response in the web browser.

19. A system in communication with a server over a network comprising:
a data processing system, including a central processing unit (CPU), for executing a computer program on a non-transitory computer usable medium to perform operations, the operations comprising:
receiving a current submission of a request;
transmitting an indication of the request to the server for receiving a current server response to the current submission of the request;
assigning a default value to the current server response for the request if the current server response is not received from the server within a time limit with respect to the current submission of the request, wherein the default value is assigned to increase responsiveness to the request by avoiding delays beyond the time limit;
logging a set of operations being performed from the assignment of the default value to the current server response;
receiving an actual value of the current server response from the server;
rolling-back the logged operations and resetting the current server response to the actual value if the actual value is different from the default value; and
using the actual value in response to resetting the current server response to the actual value.

20. The system of claim 19, wherein the assigning the default value to the current server response comprises:
setting the default value according to previous server responses being received from the server for previous submissions of the request.

21. The system of claim 20, wherein the setting the default value according to previous server responses comprises:
setting the default value according to at least one frequency distribution of values of the previous server responses.

22. The system of claim 21, wherein the at least one frequency distribution is a single frequency distribution of the values of the previous server responses, wherein the setting the default value according to at least one frequency distribution comprises setting the default value to a value of the previous server responses having a highest frequency in the frequency distribution.

23. The system of claim 21, wherein the at least one frequency distribution comprises a separate frequency distribution for each of a plurality of submission characteristics of the previous submissions of the request, wherein the setting the default value according to the at least one frequency distribution comprises setting the default value to a value of the previous server responses having a highest frequency in the frequency distribution for the submission characteristics of the current submission of the request.

24. The system of claim 23, wherein the submission characteristics comprise a time frame of the previous submissions of the request, wherein the frequency distribution for each time frame provides different frequency for the time frame.

25. The system of claim 19, wherein the receiving of a current submission of a request comprises detecting a selection of a corresponding command in a web page by a web browser, wherein the operations further comprise:
displaying an indication of the current server response in the web browser.

* * * * *